(12) United States Patent
Vrana et al.

(10) Patent No.: US 8,142,125 B2
(45) Date of Patent: Mar. 27, 2012

(54) SELF-ATTACHING FEMALE FASTENER

(75) Inventors: John J. Vrana, Rochester Hills, MI (US); David M. Shuart, Summerville, SC (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 1182 days.

(21) Appl. No.: 11/895,368

(22) Filed: Aug. 24, 2007

(65) Prior Publication Data

US 2007/0297870 A1 Dec. 27, 2007

(51) Int. Cl.
*F16B 37/06* (2006.01)

(52) U.S. Cl. .......................... 411/181; 411/188
(58) Field of Classification Search .............. 411/181, 411/180, 188, 179, 187
See application file for complete search history.

(56) References Cited

U.S. PATENT DOCUMENTS

| | | | | |
|---|---|---|---|---|
| 3,213,914 | A | * | 10/1965 | Baumle et al. ............ 411/179 |
| 3,253,631 | A | * | 5/1966 | Reusser .................... 411/179 |
| 3,878,599 | A | * | 4/1975 | Ladouceur et al. ......... 29/432.2 |
| 4,518,294 | A | * | 5/1985 | Barth ....................... 411/188 |
| 4,543,023 | A | * | 9/1985 | Capuano ................... 411/180 |
| 4,627,776 | A | * | 12/1986 | Pamer et al. .............. 411/179 |
| 5,251,370 | A | | 10/1993 | Müller et al. |
| 5,531,552 | A | * | 7/1996 | Takahashi et al. ......... 411/179 |
| 5,549,430 | A | | 8/1996 | Takahashi et al. |
| 5,613,815 | A | * | 3/1997 | Muller .................... 411/181 |
| D437,211 | S | * | 2/2001 | Pamer et al. ............. D8/397 |
| 6,220,804 | B1 | | 4/2001 | Pamer et al. |
| D448,660 | S | * | 10/2001 | Pamer et al. ............. D8/397 |
| D454,484 | S | | 3/2002 | Pamer et al. |
| D457,054 | S | | 5/2002 | Pamer et al. |
| 6,851,904 | B2 | | 2/2005 | Parker et al. |
| 6,994,500 | B2 | | 2/2006 | Ward et al. |
| 7,001,125 | B2 | | 2/2006 | Wojciechowski et al. |
| 7,112,024 | B2 | | 9/2006 | Ward et al. |
| 7,112,025 | B2 | | 9/2006 | Ward et al. |
| 7,112,142 | B2 | | 9/2006 | Wojciechowski et al. |
| 7,112,143 | B2 | | 9/2006 | Müller |

(Continued)

FOREIGN PATENT DOCUMENTS

EP 1 116 891 B1 2/2004
WO WO 2007/137868 12/2007

OTHER PUBLICATIONS

Transmittal and Translation of Specification of WO 2007/137868 filed in counterpart U.S. Appl. No. 12/303,001.

(Continued)

*Primary Examiner* — Flemming Saether
(74) *Attorney, Agent, or Firm* — Dierker & Associates, P.C.

(57) ABSTRACT

A self-attaching nut for attachment to a panel including a central pilot portion having a generally cylindrical outer surface, a flange portion surrounding the outer surface of the pilot portion including an annular groove surrounding the pilot portion having a substantially V-shaped bottom wall and a generally planar panel support surface surrounding the annular groove. The panel support surface includes a plurality of circumferentially spaced radial ribs extending into the annular groove, but spaced from the outer surface of the pilot portion. The grooves may be convex or concave or a combination of convex and concave grooves. In one embodiment, the nuts are rectangular and the back face include two pair of transverse linear grooves for interconnection by frangible wires in side to side relation.

18 Claims, 7 Drawing Sheets

U.S. PATENT DOCUMENTS

| | | | |
|---|---|---|---|
| 7,124,492 B2 * | 10/2006 | Wojciechowski et al. | 29/515 |
| 7,258,517 B2 * | 8/2007 | Ross et al. | 411/180 |
| 7,591,623 B2 * | 9/2009 | Parker | 411/180 |
| 2004/0234356 A1 | 11/2004 | Parker et al. | |
| 2006/0137166 A1 * | 6/2006 | Babej et al. | 29/509 |

OTHER PUBLICATIONS

Preliminary Examination Report on Patentability for International Appln. No. PCT/US2008/010001 dated Mar. 4, 2010 (7 pages).

* cited by examiner

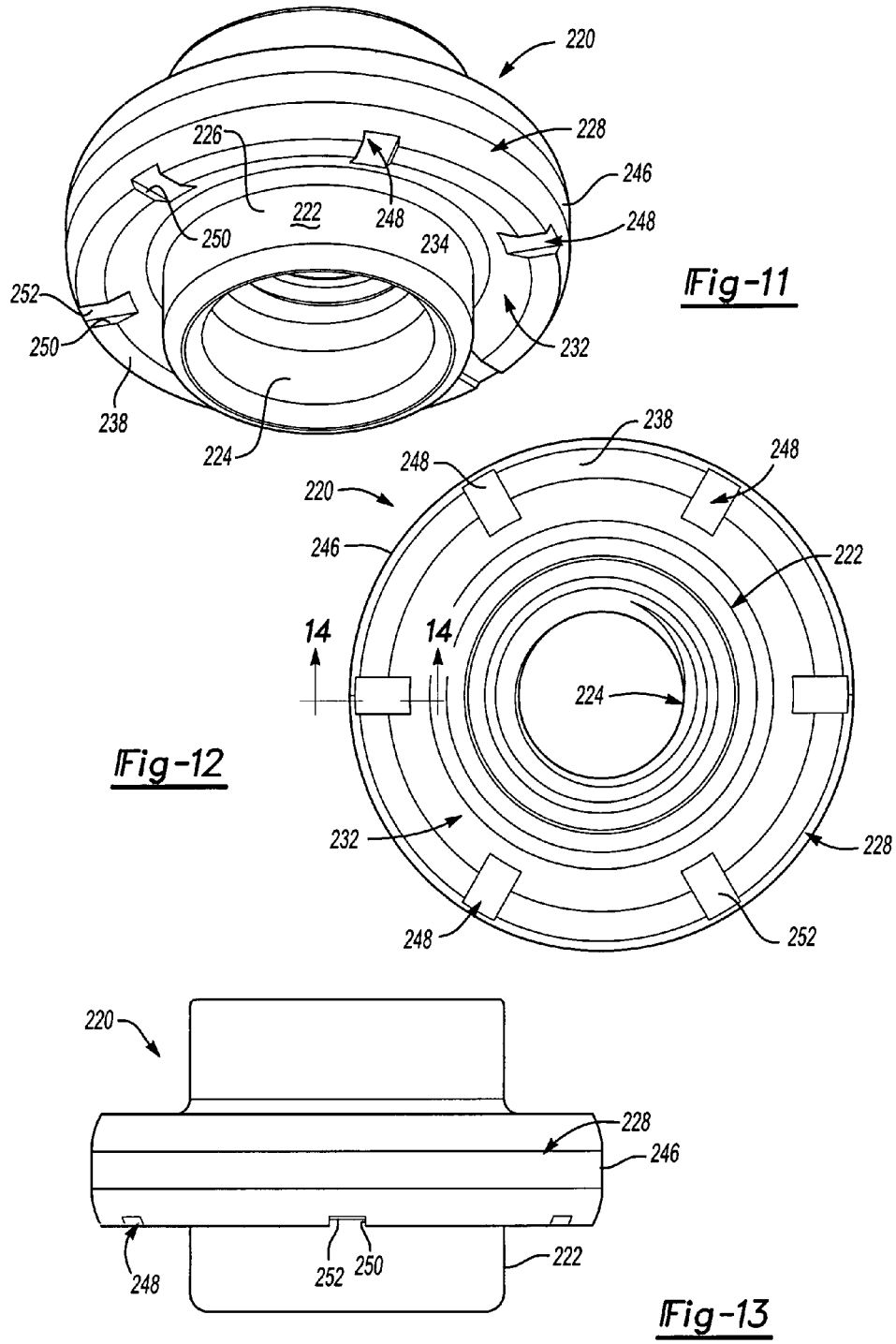

SELF-ATTACHING FEMALE FASTENER

FIELD OF THE INVENTION

This invention relates to self-attaching female fasteners, including pierce and clinch nuts, for an attachment to a panel in a press which may be formed by cold header techniques.

BACKGROUND OF THE INVENTION

Self-attaching female fasteners, including pierce and clinch nuts, formed by cold header techniques and secondary press operations generally include a body portion having an end face, a central pilot portion projecting from the end face of the body portion having a bore through the central pilot portion, a flange portion surrounding the outer surface of the pilot portion including an annular groove surrounding the pilot portion and an annular planar panel support surface surrounding the annular groove. The bottom wall of the annular groove typically includes a plurality of circumferentially spaced convex or concave radial ribs which provide resistance to rotation of the nut or torque resistance following installation in a panel. In many applications, torque resistance is an important feature of the self-attaching nut. The outer surface of the flange portion is typically round or polygonal having six or more sides. U.S. Pat. Nos. 5,531,552, 5,549,430, 6,851,904, 6,994,500, 7,001,125, 7,112,024, 7,112,025 and 7,112,142 all assigned to the assignee of this application disclose this type of fastener. Other pierce and clinch nuts of this type are disclosed in U.S. Pat. Nos. 5,251,370, 6,220,804, U.S. Design Pat. Nos. D454,484 and D457,054 and European Patent No. EP 1 116 891 B1. U.S. Patent Publication No. US 2004/0234356 A1, assigned to the assignee of this application does disclose a self-attaching nut formed by cold header techniques which may be interconnected in side to side relation by frangible wires for continuous installation in a die press. However, the need remains for improved self-attaching nuts of this type including nuts which may be interconnected by frangible wires and self-attaching nuts having improved torque resistance.

SUMMARY OF THE INVENTION

The self-attaching nut of this invention may include a central pilot portion having a bore therethrough and a generally cylindrical outer surface, a flange portion surrounding the outer surface of the pilot portion including an annular groove surrounding the pilot portion having a substantially V-shaped bottom wall extending radially outwardly from the outer surface of the pilot portion and a generally planar panel support surface surrounding the annular groove which may extend substantially perpendicular to an axis of the bore. The self-attaching nut further includes a plurality of circumferentially spaced radial ribs on the panel support surface of the flange portion extending generally radially into the annular groove, but in the disclosed embodiments, the ribs are spaced from the outer surface of the pilot portion. In one disclosed embodiment, the radial ribs are convex, projecting from the panel support surface having parallel radial side faces, and in another embodiment, the radial ribs are concave and channel-shaped having parallel side walls. The convex ribs may be generally triangular in cross-section.

The outer surface of the flange portion surrounding the panel support surface may be cylindrical or polygonal, such as octagonal as disclosed in the above-referenced patents. However, in one embodiment, the flange portion, also sometimes referred to as the body portion, is square and the back face opposite the ribs has two pair of transverse parallel grooves adapted to receive elongated frangible elements or wires for interconnecting a plurality of self-attaching fasteners in side to side relation without requiring alignment of polygonal nuts, having more than four sides or rectangular nuts having unequal sides. This invention may also be utilized with other self-attaching fasteners, including nuts formed by cold header techniques.

As will be understood by those skilled in this art, various modifications may be made to the disclosed embodiments of the self-attaching fasteners of this invention within the purview of the appended claims and the following description of the preferred embodiments does not limit this invention except as specifically set forth in the claims. Further advantages and meritorious features of the self-attaching nut of this invention will be more fully understood from the following description of the preferred embodiments, the appended claims and the drawings, a brief description of which follows.

BRIEF DESCRIPTION OF THE DRAWINGS

FIG. 11 is an end perspective view of an alternative embodiment of the self-attaching fastener of this invention;

FIG. 12 is an end view of the self-attaching fastener shown in FIG. 11;

FIG. 13 is a side view of the self-attaching fastener shown in FIGS. 11 and 12;

DESCRIPTION OF THE PREFERRED EMBODIMENTS

The disclosed embodiments of the self-attaching female fasteners or nuts of this invention are for illustrative purposes only and do not limit this invention except as specifically set forth in the appended claims. Many modifications may be made to the disclosed embodiments within the purview of the appended claims. Self-attaching female fasteners includes self-piercing nuts or pierce nuts and clinch nuts. The term nut or nuts is used herein as generic to any type of female fastener.

Figure 1:
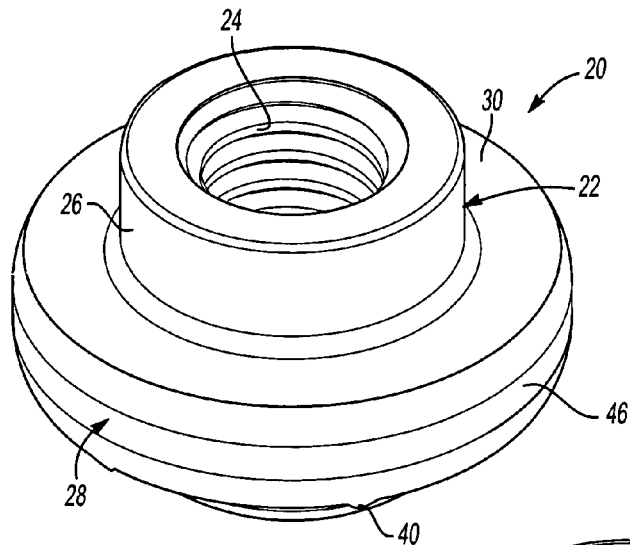
FIG. 1 is an end perspective view of one embodiment of a self-attaching fastener of this invention.
Figure 2:
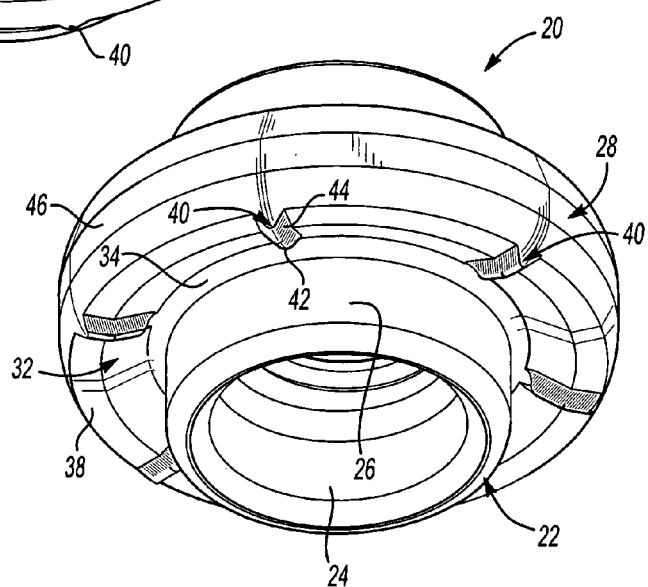
FIG. 2 is an end perspective view of the self-attaching fastener shown in FIG. 1 from the opposite end.
Figures 5, 6:
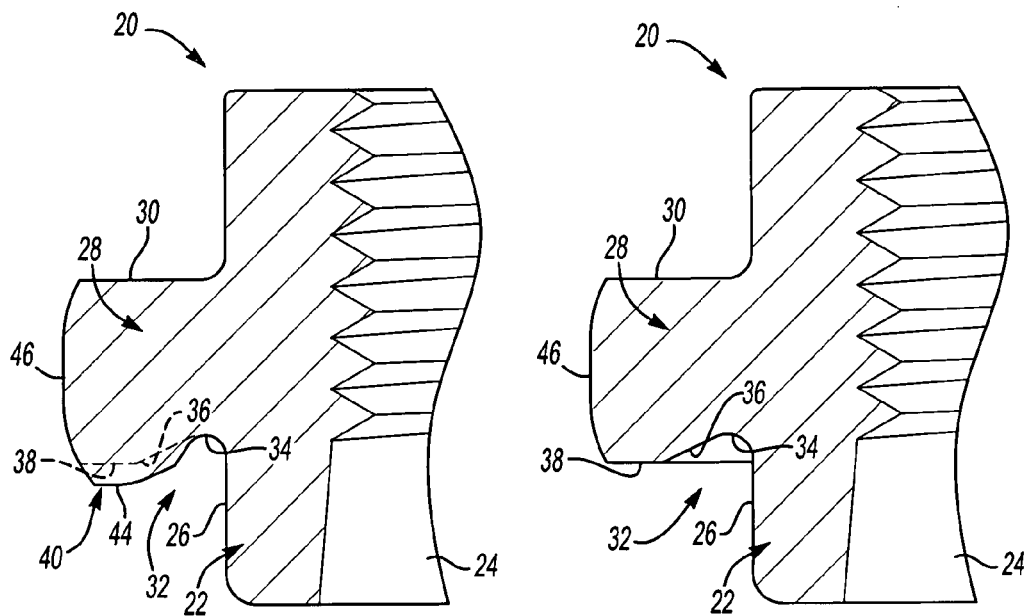
FIG. 5 is a partial side cross-sectional view of FIG. 4 in the direction of view arrows 5-5.
FIG. 6 is a partial side cross-sectional view of the self-attaching fastener shown in FIG. 4 in the direction of view arrows 6-6.
Figure 7:
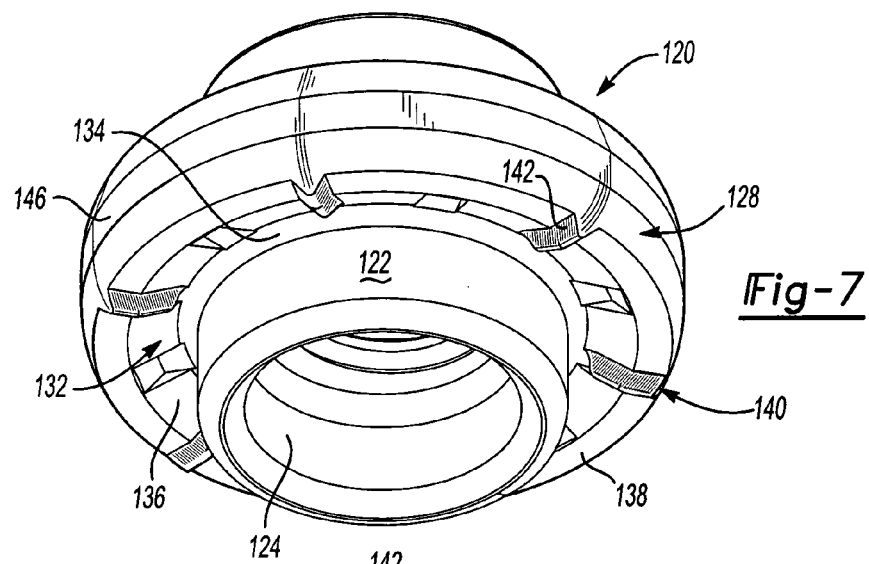
FIG. 7 is an end perspective view of an alternative embodiment of the self-attaching fastener of this invention.
Figure 8:
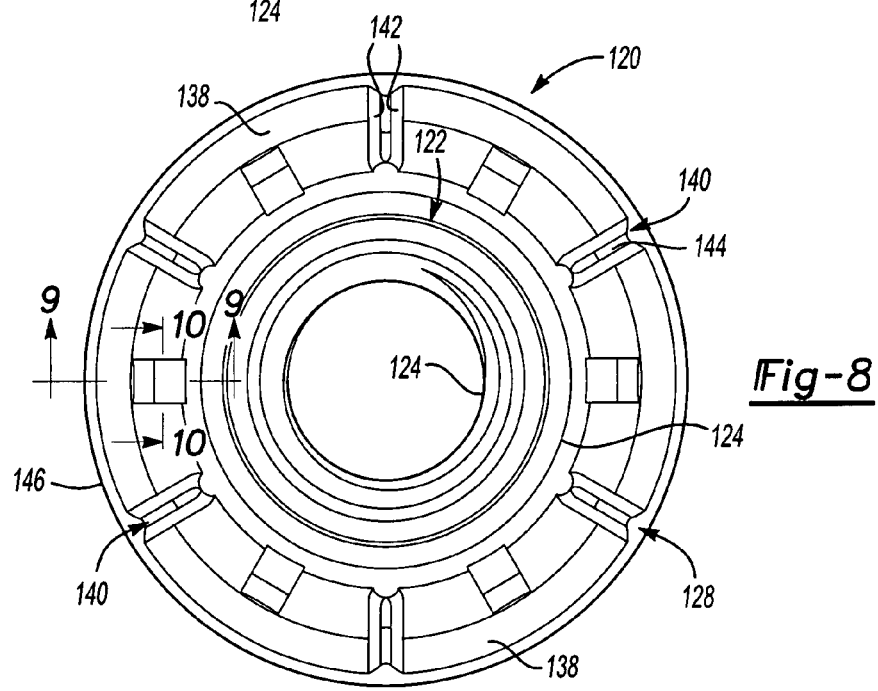
FIG. 8 is an end view of the self-attaching fastener shown in FIG. 7.

The embodiment of the self-attaching nut 20 shown in FIGS. 1 to 6 includes a central pilot portion 22 having a central bore 24 and an outer surface 26 which may be cylindrical as shown. An annular flange portion 28 surrounds the central pilot portion 22 having an annular back face 30 surrounding the pilot portion 22. As shown in FIG. 1, the annular back face 30 may be planer, extending perpendicular to the axis of the bore 24. The opposed or obverse face of the annular flange portion 28 includes a generally V-shaped annular groove 32 surrounding the pilot portion 22. In the disclosed embodiment, the annular groove 32 is "generally V-shaped," because the groove includes an arcuate surface 34 joining the outer wall 26 of the pilot portion 22 and the inclined outer surface 36 as best shown in FIG. 6 and the generally V-shaped groove further includes ribs as described below. The annular flange portion 28 further includes an annular panel support surface 38 which is received against a panel during installation of the self-attaching fastener to a panel which, in the disclosed embodiment, is planer and extends perpendicular to the axis of the central bore 24.

Figure 3:
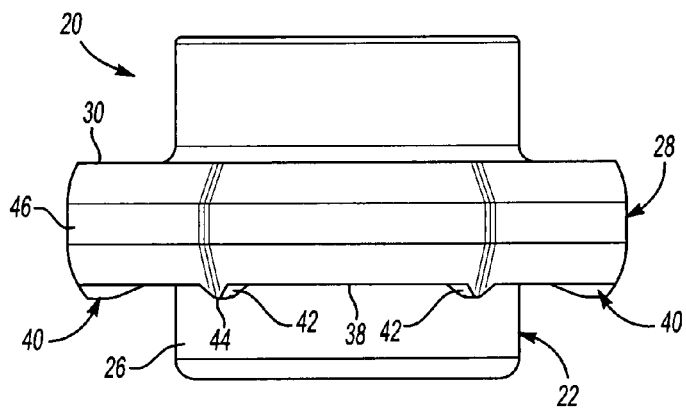
FIG. 3 is a side view of the embodiment of the self-attaching fastener shown in FIGS. 1 and 2.
Figure 4:
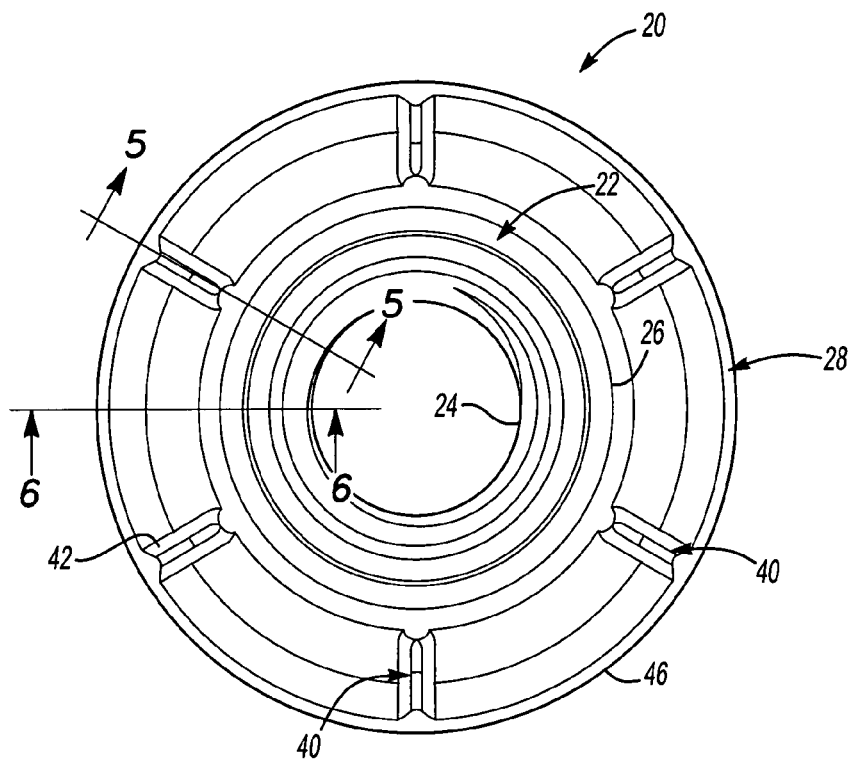
FIG. 4 is an end view of the self-attaching fastener shown in FIGS. 1 to 3.

As will be understood from the following description, each of the disclosed self-attaching nuts include radial ribs which provide resistance to rotation of the nut or torque resistance following installation of the nut in a panel. In the embodiment of the self-attaching nut 20 shown in FIGS. 1 to 6, the annular panel support or bearing surface 38 includes a plurality of circumferentially spaced radial ribs 40 which extends to the outer surface 46 of the annular flange portion 28 and radially inwardly on the inclined outer surface 36 of the V-shaped annular groove 32 as best shown in FIG. 5. In this embodiment, the radial ribs are convex and generally triangular in cross-section having radial relatively inclined side faces 42 and a top surface 44 as best shown in FIG. 3. As also shown in FIG. 5, the top surfaces or top edges 44 of the radial ribs 40 are inclined inwardly and the ribs are spaced from the outer surface 26 of the central pilot portion 22. The generally triangular radial ribs 40 as shaded in FIG. 2 for clarity. In the disclosed embodiment, the outer surface 46 of the annular flange portion 28 is generally cylindrical as shown. However, the annular flange portion 28 may also be polygonal, rectangular or square as shown in FIGS. 21 to 25 described below. The top surface 44 of the radial ribs 40 is preferably rounded as shown in FIG. 3. The bore 24 may be threaded as shown to receive a threaded bolt or male fastener or unthreaded to receive a self-tapping or thread rolling male fastener. The disclosed embodiment of the self-attaching nut 20 also includes a tubular body extension 23 projecting from the back face 30 as best shown in FIGS. 1 and 3 to provide sufficient threads to meet certain proof load requirements, but this is an optional feature.

The common elements of the self-attaching female fastener 120 shown in FIGS. 7 to 10 are numbered in the same sequence as the elements of the self-attaching female fastener 20 shown in FIGS. 1 to 6, except that the elements of the self-attaching female fastener 120 are numbered in the 100 series to reduce the requirement for a written description for a complete understanding of this embodiment. That is, the common elements of the self-attaching nut 120 may be identical to the elements of the self-attaching nut 20 except as described below. Briefly, the self-attaching nut 120 shown in FIGS. 7 to 10 includes a central pilot portion 122 having a bore 124 and an outer surface 126 which, in the disclosed embodiment, is cylindrical, as shown. An annular flange portion 128 surrounds the central pilot portion 122 including a generally V-shaped annular groove 132 defined by the outer surface 126 of the pilot portion 122 and the inclined outer surface 136 as described above.

In this embodiment, the annular panel support surface 138 includes a plurality of circumferentially spaced convex radial ribs 140 as described above, each having triangular cross-section including radial relatively inclined side faces 142 and a top surface 144. The generally triangular radial ribs 140 are also shaded in Figure in FIG. 7 for improved clarity.

Figure 9:
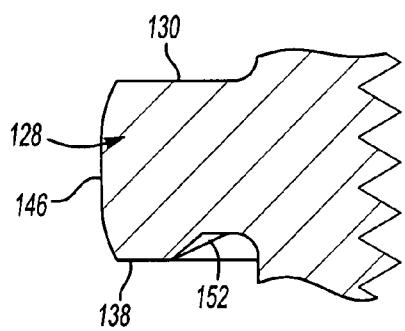
FIG. 9 is a partial side cross-sectional view of FIG. 8 in the direction of view arrows 9-9.
Figure 10:
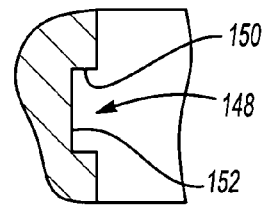
FIG. 10 is a partial side cross-sectional view of FIG. 8 in the direction of view arrows 10-10.
Figure 14:
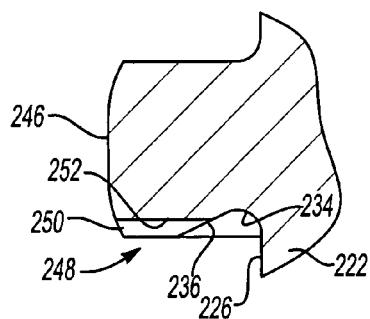
FIG. 14 is a partial side cross-sectional view of FIG. 12 in the direction of view arrows 14-14.

The embodiment of the self-attaching nut 120 shown in FIGS. 7 to 10 differs from the self-attaching nut 20 shown in FIGS. 1 to 6 and described above in that this embodiment of the self-attaching female fastener 120 also includes a plurality of circumferentially spaced concave radial ribs 148 which, in the disclosed embodiment, are channel-shaped, each having side walls 150 and a bottom wall 152 as shown in FIG. 10. The bottom wall 152 is inclined to the annular panel support surface 138 as shown in FIG. 9. It is believed that the additional channel-shaped concave radial ribs 148 will provide additional torque resistance for the self-attaching nut 120 when attached to a panel.

The common elements of the embodiment of the self-attaching female fastener 220 shown in FIGS. 11 to 14 are also numbered the same in the same sequence as the elements of the embodiments of the self-attaching female fastener 20 in FIGS. 1 to 6 and 120 in FIGS. 7 to 10, except that the common elements are numbered in the 200 series, again to reduce the required description for a full understanding of this embodiment. Briefly, the self-attaching female fastener 220 shown in FIGS. 11 to 13 includes a central pilot portion 222 having a bore 224 and a cylindrical outer surface 226, an annular flange portion 228 surrounding the central pilot portion 222 having a generally V-shaped annular groove 232 including an arcuate surface 234 located between the inclined outer surface 236 and the outer surface 226 of the pilot portion 222. The back face 230 of this embodiment also includes a body extension 223 as described above. In this embodiment, the annular panel support surface 238 includes a plurality of channel-shaped radial concave ribs 248, each having parallel radial side walls 250 and a radial bottom wall 252. As shown, the channel-shaped concave radial ribs 248 extend to the outer surface 246 of the annular flange portion 228 into the outer surface 246 of the flange portion, but are spaced from the outer surface 226 of the central pilot portion 222. The other elements of the self-attaching female fastener 220 may be identical to the elements of the embodiments of the self-attaching female fastener 20 and 120 described above.

Figure 15:
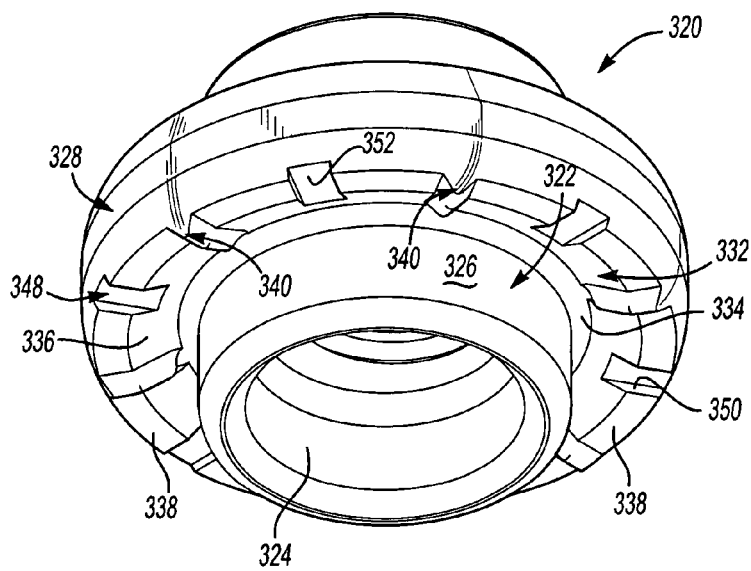
FIG. 15 is an end perspective view of an alternative embodiment of the self-attaching fastener of this invention.
Figure 16:
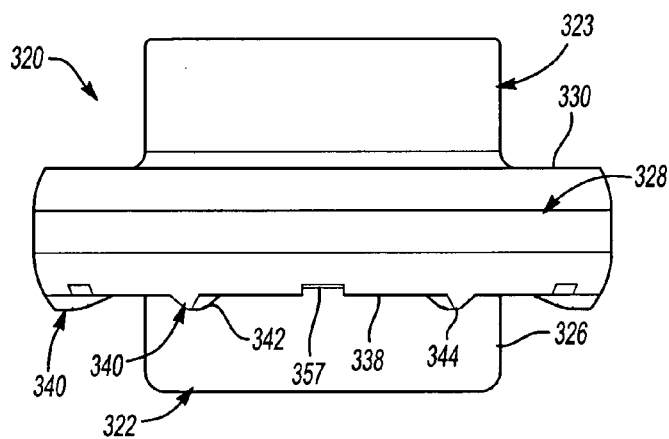
FIG. 16 is a side view of the self-attaching fastener shown in FIG. 15.

The common elements of the self-attaching female fastener 320 shown in FIGS. 15 and 16 may be the same as the elements of the self-attaching female fasteners 20, 120 and 220 described above and have also been numbered in the same sequence in the 300 series to reduce the required description for a full understanding of this embodiment as described above. Briefly, the self-attaching nut 320 illustrated in FIGS. 15 and 16 includes a central pilot portion 322 including a bore 324 and an outer surface 326 which, in the disclosed embodiment, is cylindrical, an annular flange portion 328 surrounding the central pilot portion 322 having a back face 330, a generally V-shaped annular groove 332 in the opposite face surrounding the central pilot portion 322 including an arcuate surface 334 between the inclined outer surface 336 and the outer surface 326 of the pilot portion 322, and an annular panel support surface 338 surrounding the generally V-shaped annular groove 332.

The embodiment of the self-attaching female fastener 320 illustrated in FIGS. 15 and 16 includes both convex and concave radial ribs 340 and 348 respectively, similar but not identical to the self-attaching female fastener 120 illustrated in FIGS. 7 to 10. In this embodiment, the circumferentially spaced convex radial ribs 340 may be identical to the convex radial ribs 40 in the embodiment 20 shown in FIGS. 1 to 6 and 140 in FIGS. 7 to 10. The channel-shaped concave radial ribs 348 may be identical to the channel-shaped concave radial ribs 248 in the embodiment of the self-attaching female fastener 220 illustrated in FIGS. 11 to 14. That is, in this embodiment, the convex radial ribs 340 have a generally triangular cross-section as shown in FIG. 16, including radial relatively inclined side faces 342 and a top surface 344 inclined radially inwardly. The channel-shaped concave radial ribs 348 extend through the annular panel support surface 338 into the inclined outer surface 336 of the generally V-shaped annular groove 332 and include parallel side walls 350 and a bottom wall 352 and may extend perpendicular to the axis of the bore 324 as shown. Except as described above, all of the common elements of the embodiment of the self-attaching female fastener 320 illustrated in FIGS. 15 and 16 may be identical to the embodiments previously described.

Figure 17:
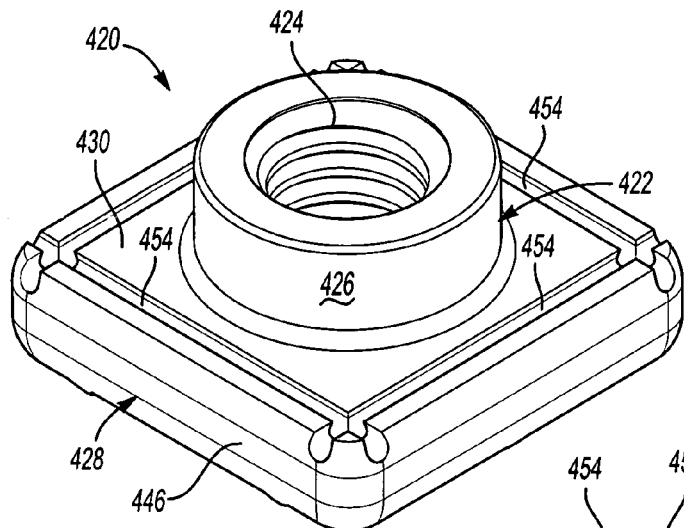
FIG. 17 is an end perspective view of an alternative embodiment of the self-attaching fastener of this invention.
Figure 18:
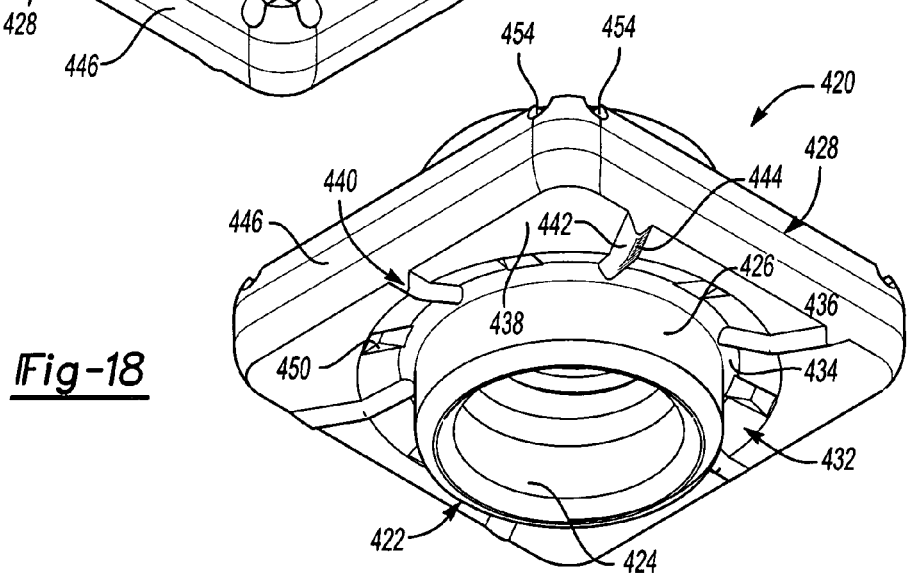
FIG. 18 is an end perspective view of the self-attaching fastener shown in FIG. 17 from the opposite end.
Figure 19:
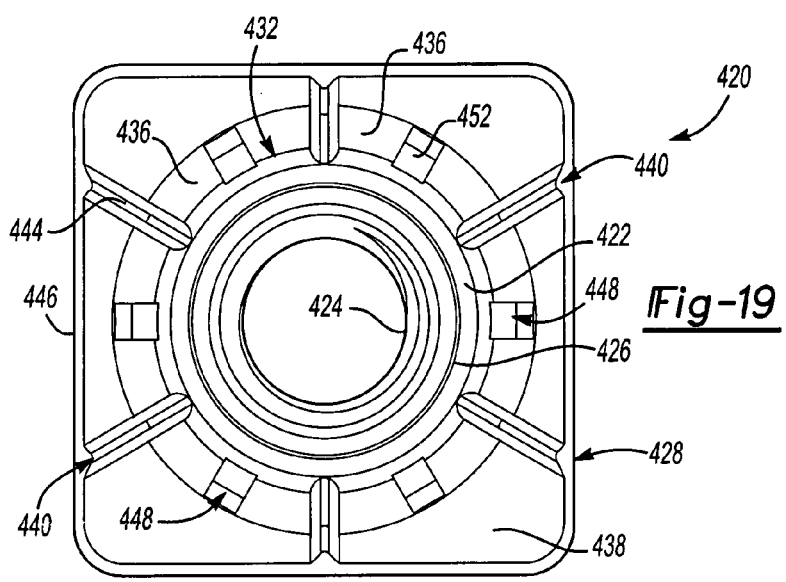
FIG. 19 is an end view of FIG. 18.

The common elements of the self-attaching female fastener shown in FIGS. 17 to 21 are also numbered in the same sequence as the previously described self-attaching female fasteners except that the common elements are numbered in the 400 series for ease of description. The common elements of the self-attaching nut 420 include a central pilot portion 422 having a bore 424 and a cylindrical outer surface 426. The annular flange portion 428 in this embodiment has a square outer surface 446 as best shown in FIGS. 17 to 19. The back face 430 of the annular flange portion 428 includes two pair of parallel grooves 454 adjacent the outer square surface 446 as best shown in FIG. 17. As discussed below, these grooves are generally semi-circular and adapted to receive frangible connector elements or frangible wires for continuous installation in a press as is known to those skilled in this art from the prior patents of the Applicant. The face of the annular flange portion 428 opposite the back face 430 includes a generally V-shaped annular groove 432 shown in FIGS. 18 and 19 including an inclined outer surface 436 and an arcuate surface 434 joining the outer surface 426 of the central pilot portion and the inclined outer surface 436. The annular panel support surface 438 surrounds the annular groove 432 as described above.

Figure 20:
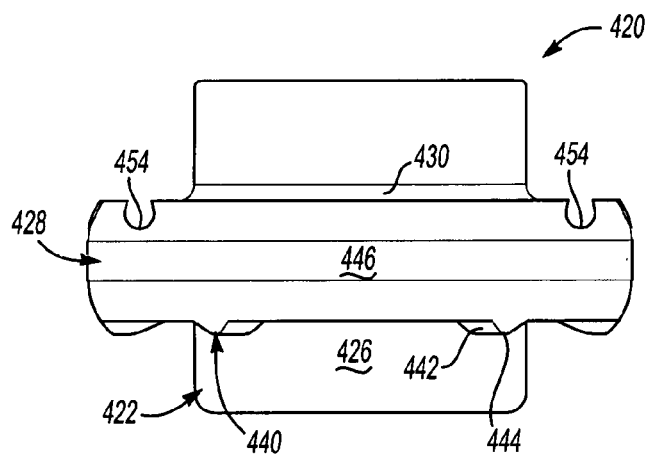
FIG. 20 is a side view of the self-attaching fastener shown in FIGS. 17 to 20.

The anti-rotation radial ribs in the embodiment of the self-attaching nut 420 may be identical to the anti-rotation ribs in the embodiment of the self-attaching nut 120 shown in FIGS. 7 to 10. That is, the anti-rotation ribs include a plurality of circumferentially spaced convex radial ribs 440 having a generally triangular cross-section as shown in FIGS. 18 and 20, having radial relatively inclined side faces 442 and a top surface or edge 444. In this embodiment, the convex radial ribs 440 extend to the outer surface 446 of the square annular flange portion 428 as shown in FIGS. 18 and 19. The channel-shaped radial concave ribs 448 include opposed side walls 450 and an inclined bottom wall 452 as described above with reference to FIGS. 7 to 10.

Figure 21:
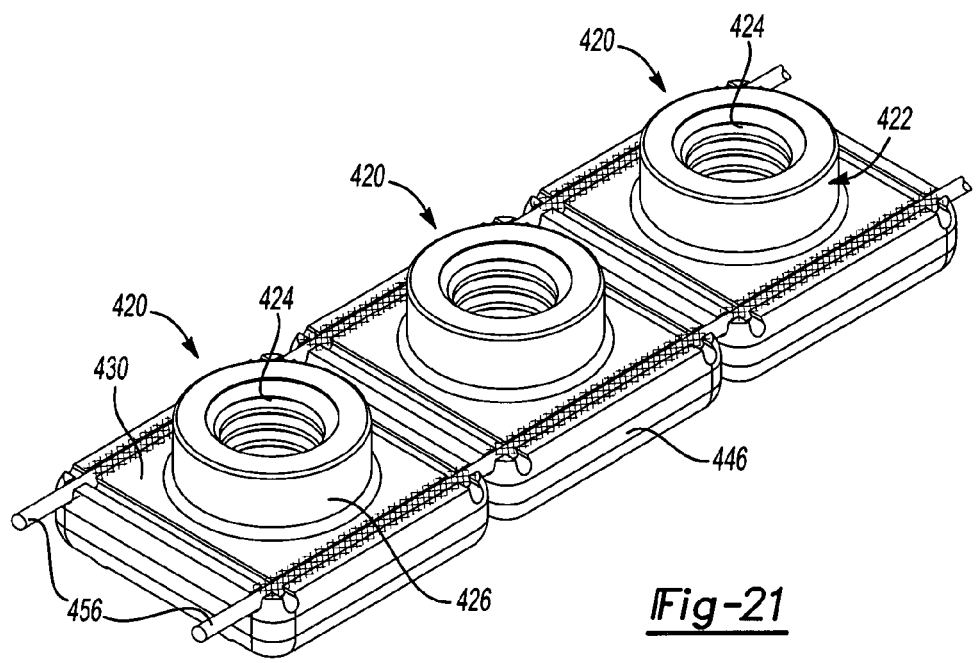
FIG. 21 is an end perspective view of a plurality of self-attaching fasteners shown in FIGS. 17 to 20 interconnected in side by side relation.

The transverse pair of parallel grooves 454 in the back face 430 of the annular flange portion 428 are generally circular or a semi-circular as best shown in FIG. 20 and adapted to receive frangible wires or frangible elements 456 as shown in FIG. 21. Because the body or flange portion is square rather than round or polygonal with more than four sides or rectangular with sides of different length, it is simple to align the square side faces 446 as shown in FIG. 21 and roll or insert frangible wires 456 to align the self-attaching nuts 420 for continuous installation in a press. The back face 430 may then be knurled to retain the self-attaching nuts 420 as shown in FIG. 421. The strip of self-attaching female fasteners 420 shown in FIG. 21 may then be coiled and fed to an installation head (not shown) as described in the prior patents of the Applicant.

The embodiments of the self-attaching nuts disclosed herein may be attached to a panel by piercing a circular opening in a panel and receiving the central pilot portion through the panel opening and deforming or clinching the panel with a die, deforming the panel into the generally V-shaped annular groove of the self-attaching nut. The free end of the central pilot portion may be deformed radially outwardly or the deformation of the panel in the V-shaped groove may be sufficient to permanently retain the self-attaching nut to a panel. As will be understood by those skilled in this art, the convex radial ribs are driven into the panel during installation to prevent rotation of the self-attaching nut on the panel following installation. Where the self-attaching nut includes concave radial ribs, such as the channel-shaped radial concave ribs disclosed herein, the panel is deformed into the concave radial ribs during installation.

As will be understood by those skilled in this art, various modifications may be made to the embodiments of the self-attaching nuts disclosed herein within the purview of the appended claims. As set forth, the outer surface of the radial flange may be polygonal having more than four sides or round as shown in FIGS. 1 to 16. The square self-attaching nut 420 having two pair of transverse parallel wire grooves 454 may also be utilized with other self-attaching nuts. The self-attaching nuts of this invention thus meet the objects of this invention.

The invention claimed is:

1. A self-attaching nut for attachment to a panel, comprising:
   a central pilot portion having a bore therethrough and a generally cylindrical outer surface;
   a flange portion surrounding said outer surface of said pilot portion including i. an annular groove surrounding said pilot portion having a substantially V-shaped bottom wall, the annular groove extending radially outwardly from said outer surface of said pilot portion and ii. a generally planar panel support surface surrounding said annular groove extending substantially perpendicular to an axis of said bore; and
   a plurality of circumferentially spaced radial ribs on or in said panel support surface of said flange portion extending into said annular groove, but spaced from said outer surface of said pilot portion, wherein said radial ribs are convex, projecting from said panel support surface having radial side faces and a top spaced above said panel support surface.

2. The self-attaching nut as defined in claim 1, wherein said radial ribs are triangular in cross-section having radial side faces and a rounded top surface.

3. The self-attaching nut as defined in claim 1, wherein said self-attaching nut further includes circumferentially spaced concave radial ribs.

4. The self-attaching nut as defined in claim 3, wherein said circumferentially spaced concave radial ribs are channel-shaped having side walls and a bottom wall.

5. The self-attaching nut as defined in claim 1, wherein said flange portion has a rectangular outer surface.

6. The self-attaching nut as defined in claim 5, wherein said ribs extend to said rectangular outer surface of said flange portion.

7. The self-attaching nut as defined in claim 1, wherein said flange portion has a square outer surface.

8. The self-attaching nut as defined in claim 7, wherein said flange portion of said self-attaching nut includes a back face opposite said ribs having two pair of transverse parallel grooves adapted to receive frangible connector elements interconnecting a plurality of said self-attaching fasteners in side to side relation.

9. The self-attaching nut as defined in claim 1, wherein said substantially V-shaped bottom wall of said annular groove is defined by said outer surface of said pilot portion and an inclined outer surface extending upwardly to said panel support surface.

10. The self-attaching nut as defined in claim 9, wherein said substantially V-shaped bottom wall includes an arcuate surface between said outer surface of said pilot portion and said inclined outer surface of said annular groove.

11. A self-attaching nut for attachment to a panel, comprising:
 a central pilot portion having a bore therethrough and a generally cylindrical outer surface;
 a flange portion surrounding said outer surface of said pilot portion including i. an annular groove surrounding said pilot portion having a substantially V-shaped bottom wall, the annular groove extending radially outwardly from said outer surface of said pilot portion and ii. a generally planar panel support surface surrounding said annular groove extending substantially perpendicular to an axis of said bore;
 a plurality of circumferentially spaced radial ribs on or in said panel support surface of said flange portion extending into said annular groove, but spaced from said outer surface of said pilot portion, wherein said radial ribs are concave having a bottom wall spaced below said panel support surface of said flange portion; and
 circumferentially spaced convex radial ribs.

12. The self-attaching nut as defined in claim 11, wherein said convex radial ribs have a triangular tangential cross-section.

13. The self-attaching nut as defined in claim 11, wherein said convex radial ribs extend above a surface of said panel support surface and extend into said annular groove, but are spaced from said outer surface of said pilot portion.

14. A self-attaching nut for attachment to a panel, comprising:
 a central pilot portion having a bore therethrough and a substantially cylindrical outer surface;
 a flange portion surrounding said outer surface of said pilot portion including an annular groove surrounding said pilot portion having a substantially V-shaped bottom wall defined by said outer surface of said pilot portion and an outer surface inclined outwardly to a substantially planar panel support surface surrounding said annular groove; and
 a plurality of circumferentially spaced convex radial ribs projecting from said panel support surface and extending into said outer surface of said annular groove.

15. The self-attaching nut as defined in claim 14, wherein said convex radial ribs have a generally triangular cross-section including radial relatively inclined side faces projecting from said panel support surface.

16. The self-attaching nut as defined in claim 14, wherein said self-attaching nut further includes circumferentially spaced concave radial ribs.

17. The self-attaching nut as defined in claim 16, wherein said concave radial ribs are channel-shaped having side walls and a planar bottom wall.

18. The self-attaching nut as defined in claim 14, wherein said flange portion has a square outer surface and includes a back face opposite said ribs having two pair of transverse parallel grooves adapted to receive frangible connector elements for interconnecting a plurality of self-attaching fasteners in side to side relation.

* * * * *